United States Patent [19]
Po et al.

[11] Patent Number: 5,905,136
[45] Date of Patent: May 18, 1999

[54] POLYCONDENSATION CATALYZERS FOR THE SYNTHESIS OF POLYETHYLENE TEREPHTALATE

[75] Inventors: Riccardo Po, Livorno; Luigi Pelosini, Fontaneto D'Agogna, both of Italy

[73] Assignees: Montefibre S.p.A., Milan; Inca International S.p.A., Matera, both of Italy

[21] Appl. No.: 08/849,458

[22] PCT Filed: Dec. 6, 1995

[86] PCT No.: PCT/EP95/04883

§ 371 Date: Jun. 19, 1997

§ 102(e) Date: Jun. 19, 1997

[87] PCT Pub. No.: WO96/19518

PCT Pub. Date: Jun. 27, 1996

[30] Foreign Application Priority Data

Dec. 21, 1994 [IT] Italy .................................. M194A2585

[51] Int. Cl.$^6$ ................ C08G 63/78; C08K 5/41

[52] U.S. Cl. .................... 528/279; 528/274; 528/283; 528/285; 528/308; 528/308.6; 524/745; 524/783

[58] Field of Search .................... 528/274, 279, 528/283, 285, 308, 308.6; 524/745, 783

[56] References Cited

U.S. PATENT DOCUMENTS 4,447,595  5/1984  Smith et al. ........................... 528/274

*Primary Examiner*—Samuel A. Acquah
*Attorney, Agent, or Firm*—Oblon, Spivak, McClelland, Maier & Neustadt, P.C.

[57] ABSTRACT

The subject is a class of catalyzers to be used in the stage of polycondensation of the synthesis of poly(ethylene terephtalate), consisting of metal and non-metal derivatives in composition with sulfonic acids mixed with titanium compounds so that the final polymer contains a sulfur quantity of 5-60 ppm and a quantity of metals between 2 and 100 ppm.

11 Claims, No Drawings

POLYCONDENSATION CATALYZERS FOR THE SYNTHESIS OF POLYETHYLENE TEREPHTALATE

This invention concerns a class of catalyzers to be used in the stage of polycondensation during the synthesis of poly(ethylene terephtalate). Poly(ethylene terephtalate) (PET) is a thermoplastic polyester used in the production of textile fibers, containers and films for food use, supports for magnetic tapes and photographic films. It is industrially compounded through a multi stage synthesis of ethylene glycol and terephtalic acid or dimethyl terephtalate, in the presence of the proper catalyzers.

PET is synthesized in two stages.

During the first stage (scheme 1), dimethyl terephtalate (DMT) reacts in the presence of alchoolysis catalyzers in order to give an oligomeric mixrure the main component of which is bi-(hydroxyethyl)terephtalate (BHET).

Due to improvements in the purification of terephtalic acid and because it costs less than DMT, in recently perfectioned processes, terephtalic acid instead of ester is used as raw material. In such case the reaction of the first stage (scheme 2) is an esterification (the result also in this case is BHET). BHET obtained in either of the ways explained is transformed in poly(ethylene terephtalate).

scheme 1

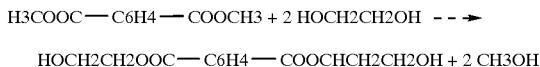

scheme 2

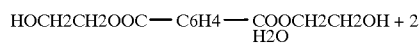

scheme 3

The optimum characteristics of a polycondensation catalyzer are: high activity, absence of secondary reactions which could give formations, for example of acetaldehyde or unwanted coloured generations in the final material, atoxicity, particularly for the food applications of PET.

Patent literature describes a huge variety of inorganic, organic and organometal compounds that are efficient in catalyzing the polycondensation reaction. Since the discovery of PET catalyzers consisting of antimonium compounds are described, especially oxide, acetate, alcoholates. It is known however, that in order to obtain sufficiently fast reaction kinetics it is fundamental to use such compounds in quantities so that at the end of the reaction PET contains 200–300 ppm of metal. Which is undesirable for polymer applications to food containers.

Titanium compounds have a very high activity, though they cause the formation of a yellow colouring in the final material due to the formation of acethaldheyde and of degradation products (J. M. Besnoin and K. Y. Choi, J. Macromol. Sci., Rev. Macromol. Chem. Phys., C29, 55 (1989)). Mixtures of titanium compounds with other metallic derivatives such as cobalt, manganese and magnesium, nickel, zinc, lanthanum, stannum and others are described.

Germanium compounds represent another considerable class of polycondensation catalyzers. The weakness of germanium compounds consists in the incredibly high cost and a higher toxicity than antimonium. Combinations of titanium and germanium are reported in several patents. Another metal that gives derivatives provided with catalytic activity is stannum, though they have a quite reduced activity, and they also cause the polymer's dark-yellow colouring.

The protonic acids have a moderate catalytic activity, and cause the di- and trimerization of ethylene glycol, which remains in the chain of the final polymer drastically lowering its fusion temperature until making it completely amorphous, and reducing its thermic and hydrolytic stability. The compounds described are sulfuric acid and acids, esters, anhydrides, amides and sulfonic amides.

None of these systems presents the above described characteristics in the same time (high activity, atoxicity and absence of secondary reactions).

We have by now surprisingly overcome these problems carrying out the polycondensation in the polyethylene terephtalate synthesis through a catalyzer which is formed by a mixture or derivatives of: metallic and non metallic elements, titanium, sulfonic acid.

According to this, the purpose of this invention is a composition able to catalyze the polycondensation of bi(2-hydroxyetil) terephtalate or its homologous oligomers, constituted by the derivatives of elements belonging to the following groups: IVA, VA. The composition is also characterized by the fact that it contains:

a sulfonic acid in its general formula $$RSO_3H$$

in quantity so that sulphur in the final polymer is between 5 and 60 ppm, R stands for an organic radical that can be linear or ramified alkylic, saturated annular or aromatic containing up to 20 carbon atoms;

a titatium derivative in such quantity so that the residuum of titanium in the final polymer is between 1 and 6 ppm: being the elements belonging to the groups IVA, VA, in quantity so that the element in the final polymer is between 0 and 94 ppm.

According to the standard procedure, in the first stage (scheme 1). dymethyl terephtalate (DMT) reacts in atmospheric pressure and a temperature of about 160–190° C. with residuum of ethylene glycol (2–2.2: 1 in moles) at the presence of alcoholysis catalyzers in order to give an oligomeric mixture the main constituent of which is bi(2-hydoxyetil) terephtalate (BHET). As residual product of the reaction methanol is released. The most commonly used catalyzes for the alcoholysis stage are magnesium, cobalt, manganese, zinc and calcium acetates and titatium alcoholates.

Therephtalic acid instead of ester can be used as raw material. In such case the reaction of the first stage (scheme 2) is an esterification (the product is also in this case BHET), and water is the residual product distilled; the reaction occurs in mild pressure and with temperatures some tens of degrees hither than in the case of the reaction of DMT. Usually no catalyzer is used in such case. BHET obtained through either of the two ways described is transformed (scheme 3) in poly(ethylene terephtalate) with temperatures of 260–290° C. and pressures below a millibar in the presence of stabilizers and polycondensation catalyzers object of the invention. During the reaction ethylene glycol is removed by distillation. The stabilizers (phosphoric acid, trimethyl phosphate, triphenyl phosphate, or the correspondent phosphites) have the purpose of deactivating the first stage catalyzer (when used) and preventing unwanted secondary reactions from taking place.

The quantity of RSO3H compound to be used has to provide a polyester containing sulphur expressed as elementary sulphur between 5 and 60 ppm, preferably below 50 ppm. Sulfonic acids examples useful in order to put the invention into effect are benzenesulfonic acid, p-toluenesulfonic acid, naphtalenesulfonic acid, ethanesulfonic acid, propanesulfonic acid, cyclohexanesulfonic acid.

Aromatic sulfonic acids are preferred, such as benzenesulforic acid, p-toluenesulfonic acid, naphtalenesulfonic acids.

Titanium derivatives can be different compounds as long as they are soluble.

Carboxylates and alcoholates are preferred.

Metallic and non-metallic derivatives to be used together with the compound of RSO3H formula and with titanium derivatives can be salts, oxides or metallo-organic derivatives of elements belonging to groups IVA, VA. In this invention are particularly preferred elements such as germanium stannum, antimonium more specifically germanium and antimonium. Such elements can be used especially in their oxides, carboxylates (paricularly acetates), alcoholates (particularly glycolates, methylates, ethylates, isopropylates, or butylates) or sulfonates (especially benzenesulfonates, toluenesulfonates, naphtalenesulfonates). The quantity of metallic or non-metallic derivative has to provide a polyester with a content of total sum of metal or non-metal and titanium between 2 and 100ppm. A particularly preferred combination is constituted by a titanium derivative and an antimonium derivative, in quantity between 1 and 6 ppm for the first and between 50 and 94 for the second. Otherwise the combination of a titanium and germanium derivative can be used, in the same quantities described for the previous combination, or the the titanium derivative in quantity of 2–6ppm. Catalytic system so conceived have the following characteristics.

a) They have high activity. In fact they have to provide PET with intrinsic viscosity of 0.5–0.7 dl/g in reaction times not over 4 hours.

b) They don't originate widespread secondary reactions, as shown by the final polymer colour and by the levels of diethyleneglycol and of acetaldehyde.

c) They contribute to the presence of heavy metals in quantities that are below 100 ppm (starting from terephtalic acid instead of dimethyl ester are the only present metal.)

d) They have a contained cost.

The polymer obtained with these catalytic systems is characterized by the following parameters.

1. Intrinsic viscosity (IV) is measured out of polymer solutions in phenol-tetrachloroethane 60:20 in weight at 30° C. by an automatic viscometer Shotte-Gerate.

2. The metal content is defined in terms of metal or sulphur ppm in the final polymer, depending on the quantities of catalyzers weighed and introduced in the reaction mixture.

3. Diethylene glycol (DEG) and triethylene glycol (TEG). It consists of the weight percentage of DEG (or TEG) contained in the the polymer and it is determined by the gas chromatographic analysis of the hydrolysis products of PET according to Allen B. J.'s method in Anal. Chem. vol 49, pg 741, 1977.

4. Acetaldehyde dropout. The polymer is milled in liquid nitrogen and it is processed at 150° C. for 20 minutes. Acetaldehyde, released because of permanence in the polymer at 280° C. for 5 minutes, is measured through the thermic desorption combined with gas chromatographic analysis by head space.

The following examples are reported for a better comprehension and not for a limit to the invention.

EXAMPLE 1 (COMPARATIVE)

In a 40 l steel reactor are introduced, in inert atmosphere, 19.4 Kg (100 moles) of dimethyl terephtalate, 13.64 Kg (220 moles) of ethylene glycol and 100 ml of a glycolic solution containing 0.70 g of tetrahydrate manganese acetate. 3.06 g of tetrahydrate magnesium acetate, 1.25 g dihydrate zinc acetate. 2.84 g of tetrahydrate cobalt acetate and 1.64 sodium benzoate. The reaction mixture is taken up to 180° C. and is maintained at such temperature for about 4 hours until complete methanol distillation, after which the temperature has gone up to 225° C. and 10 g of dimethyl phosphate in glycolic solution has been added and the polycondensation catalyzer made of 0.46 g of tetraisopropylate titanium (Ti 4 ppm), 3.68 g of monohydrate polyensulfonic acid (S 32 ppm). The pression is gradually reduced to 79.98 pa (0.6 torr) and temperature is increased to 285° C. mantaining these conditions for 4 hours; during all this time the excess of ethylene glycol has been removed. After bringing the equipment back to atmospheric pressure with N2, the polymer is extruded and pelletted. A colourless polymes with the characteristics listed in table 1 is obtained.

EXAMPLES 2–5 (EXAMPLE 2—COMPARATIVE)

A polymer is prepared using methodologies and reactives as in example 1, though using the catalyzers as follows.

example 2: 0.69 g of tetraisoproplylate titanium (Ti 6 ppm), 5.52 g of monohydrate p-toluensulfonic acid (S 48 ppm);

example 3: 0.69 g of tetraisopropylate titanium (Ti 6 ppm), 5.52 g of monohydrate p-toluensulfonic acid (S 48 ppm), 1.84 g of antimonium trioxide (Sb 80 ppm);

example 4: 0.46 tetraisopropylate titanium (Ti 4 ppm), 3.68 g monohydrate p-toluensulfonic acid (S32 ppm), 1.84 g of antimonium trioxide (Sb 80 ppm);

example 5: 0.23 g tetraisopropylate titanium (Ti 2 ppm), 1.84 g of monohydrate p-toluensufonic acid (S 16 ppm), 1.84 g of antimonium trioxide (Sb 80 ppm).

In all cases a colourless polymer is obtained, whose characteristics are listed in table 1

EXAMPLES 6–7 (COMPARATIVE)

The examples have been effected as in example 1 though using the following polycondensation catalyzers.

ex.6: 7.36 g Sb trioxide (Sb320 ppm)

ex.7: 3.68 g Sb trioxide (Sb 160 ppm)

In both cases the extruded polymer has a grey colour and with high levels of metal and acetaldehyde (consisting respectively of 70 and 62 micrograms per gram). The other characteristics are listed in table 1.

EXAMPLES 8–9 (COMPARATIVE)

The examples have been carried out as in example 1 though using the following polycondensation catalyzers.

es.8: 2.76 g Sb trioxide (Sb 120 ppm)

es.9: 1.84 g Sb trioxide (Sb 80 ppm)

In both cases the catalyzer activity is non satisfactory, in the case of example 9 a very fluid polymer is obtained which is also very difficult to extrude. The characteristics are listed in table 1.

EXAMPLES 10–11 (COMPARATIVE)

The examples have been carried out as in example 1 though using the following polycondensation catalyzers.

es. 10: 2.31 g Ti tetraisopropylate (Ti 20 ppm)

es. 11: 0.69 g Ti tetraisopropylate (Ti 6 ppm)

It is clear from the diagram that in both cases the polymer is degraded due to collateral reactions and the material ends up having a yellow colouring. The other characteristics are listed in table 1.

EXAMPLE 12 (COMPARATIVE)

The example has been carried out as in example 1 though with 36.8 g of p-toluensufonic acid (S 320 ppm) as catalyzer.

During the polymerization the reactor's pipelines have repeatedly clogged due to the oligomeric sublimination from the reaction mass.

The polymer, as table 1 shows, contains high quantites of di- and tri- ethylene glycol, which cause a drastic upsetting of the characteristics such as the absence of the melting point and the reduction of transition to glass temperature below 50° C.

EXAMPLES 13–14 (COMPARATIVE)

The examples have been carried out as in example 1, though using the following polycondensation catalyzers.

es.13: 1.84 g Sb trioxide (S 80 ppm). 0.69 Ti tetraisopropylate (Ti 6 ppm)

es. 14: 0.92 g Ti tetraisopropylate (Ti 8 ppm), 7.36 g p-toluensulfonic acid (S 64 ppm)

The polymers, once extruded, have a slight yellow colouring and, in the case of example 14 it contains high quantities of diethylene glycol and triethylene glycol. In the case of example 13 the polymer shows a moderate acetaldehyde release. The characteristics are shown in table 1.

EXAMPLE 15 (COMPARATIVE)

The example has been carried out as in example 1, though with 5.52 g of monohydrate p-toluensulfonic acid (S 48 ppm), 1.84 g of antimonium trioxide (Sb 80 ppm).

As table 1 shows. The quantity of DEG is high.

TABLE 1

| Example | Sb | Ti (ppm) | S | V.i. (dl/g) | DEG (% weight) | CH3CHO microg/g |
|---------|-----|----------|-----|-------------|----------------|-----------------|
| 1       |     | 4        | 32  | 0.53        | 1.48           | 42              |
| 2       |     | 6        | 48  | 0.56        | 2.05           | 37              |
| 3       | 80  | 6        | 48  | 0.62        | 2.20           | 45              |
| 4       | 80  | 4        | 32  | 0.62        | 1.50           | 41              |
| 5       | 80  | 2        | 16  | 0.60        | 0.74           | 14              |
| 6       | 320 |          |     | 0.67        | 0.70           | 70              |
| 7       | 160 |          |     | 0.66        | 0.74           | 62              |
| 8       | 120 |          |     | 0.50        | 0.51           | 47              |
| 9       | 80  |          |     | 0.30        | n.d.           | 46              |
| 10      |     | 20       |     | 0.59        | 1.79           | 20              |
| 11      |     | 6        |     | 0.50        | 1.54           | 25              |
| 12      |     |          | 320 | n.d.        | 16.6(a)        | n.d.            |
| 13      | 80  | 6        |     | 0.58        | 0.90           | 78              |
| 14      |     | 8        | 64  | 0.55        | 4.13(b)        | 40              |
| 15      | 80  |          | 48  | 0.61        | 4.41           | 30              |

(a)TEG 6.1%
(b)TEG 0.34%
n.d. not determined

We claim:

1. A composition for catalyzing the polycondensation of bis(2-hydroxyethyl) terephthalate or its homologous oligomer to form a polymer thereof, comprising (1) a sulfonic acid of the formula $RSO_3H$, wherein R is an organic radical containing 1–20 carbon atoms and is selected from the group consisting of linear and branched alkyl radicals, saturated cyclic radicals, and aromatic radicals;

(2) a titanium derivative; and (3) a derivative of a group IVA or VA element;

wherein components (1)–(3) are present in amounts such that the polymer contains 5–60 ppm of sulphur, 1–6 ppm of titanium, and 0–94 ppm of group IVA or VA element.

2. The composition according to claim 1 wherein the quantity of sulphur in the final polymer is between 5 and 50 ppm.

3. The composition according to claim 1 wherein the sulfonic acid is an aromatic sulfonic acid.

4. The composition according to claim 3 wherein the sulfonic acid is p-toluensulfonic acid.

5. The composition according to claim 3 wherein the sulfonic acid is benzenesulfonic acid.

6. The composition according to claim 3 wherein the sulfonic acid is naphthalenesulfonic acid.

7. The composition according to claim 1 wherein the titanium derivative is a carboxylate.

8. The composition according to claim 1 wherein the titanium derivative is a alcoholate.

9. The composition according to claim 1 wherein the group IVA or VA element is antimonium.

10. The composition according to claim 1 wherein the group IVA or VA element is germanium.

11. The composition according to claim 1, wherein component (3) is a derivative of a group VA element.

* * * * *